(12) United States Patent
VanGompel

(10) Patent No.: US 8,392,602 B2
(45) Date of Patent: Mar. 5, 2013

(54) EMBEDDING CONTROLLERS AND DEVICES WITH DATA TO FACILITATE UP-TO-DATE CONTROL AND CONFIGURATION INFORMATION

(75) Inventor: Dave VanGompel, Solon, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1975 days.

(21) Appl. No.: 11/239,890

(22) Filed: Sep. 30, 2005

(65) Prior Publication Data

US 2007/0078956 A1    Apr. 5, 2007

(51) Int. Cl.
*G06F 15/16* (2006.01)
*G06F 13/42* (2006.01)
*H04B 7/00* (2006.01)

(52) U.S. Cl. ......... 709/236; 709/232; 710/106; 455/517
(58) Field of Classification Search ........... 709/233–236
See application file for complete search history.

(56) References Cited

U.S. PATENT DOCUMENTS

| | | | |
|---|---|---|---|
| 6,330,517 B1* | 12/2001 | Dobrowski et al. | 702/104 |
| 6,453,346 B1* | 9/2002 | Garg et al. | 709/224 |
| 2003/0076850 A1 | 4/2003 | Jason, Jr. | |
| 2003/0109270 A1* | 6/2003 | Shorty | 455/517 |
| 2004/0021679 A1 | 2/2004 | Chapman et al. | |
| 2004/0024728 A1* | 2/2004 | Suenaga et al. | 707/1 |
| 2004/0054789 A1* | 3/2004 | Breh et al. | 709/229 |
| 2004/0153171 A1* | 8/2004 | Brandt et al. | 700/9 |
| 2004/0186603 A1* | 9/2004 | Sanford et al. | 700/95 |
| 2004/0230323 A1* | 11/2004 | Glanzer et al. | 700/18 |
| 2005/0188145 A1* | 8/2005 | Nalawadi et al. | 711/4 |
| 2006/0244565 A1* | 11/2006 | Friedrich et al. | 340/10.1 |
| 2007/0067767 A1* | 3/2007 | Da Silva Neto | 717/174 |

FOREIGN PATENT DOCUMENTS

| | | |
|---|---|---|
| CN | 1284682 | 2/2001 |
| CN | 1618054 | 5/2005 |
| JP | 2004054351 A * | 2/2004 |

OTHER PUBLICATIONS

Ian McGregor; The Relationship Between Simulation and Emulation; 2002;ACM; 1683-1688.*
Chinese OA dated Aug. 1, 2008 for Chinese Application Serial No. 200610141418.X, 15 pages.

(Continued)

*Primary Examiner* — Ashok Patel
*Assistant Examiner* — Evans Desrosiers
(74) *Attorney, Agent, or Firm* — Turocy & Watson, LLP; R. Scott Speroff; John M. Miller

(57) ABSTRACT

An industrial automation system comprising a processor with an updating component coupled to automation devices via a network. The updating component reads control information from machine readable representations of the devices and populates a data structure with the control information. The updating component also updates configuration information of a device from data stored in a file object and/or the data structure, further allowing this transfer to be fragmented into a plurality of messages if the configuration information exceeds a threshold. As well, a vendor deployment methodology is provided that embeds devices and firmware for devices with a Device Type Manager (DTM) prior to deployment and can optionally allow post deployment updates to the DTM.

19 Claims, 10 Drawing Sheets

OTHER PUBLICATIONS

Klaus-Peter Hermes. "FDT Navigator Frame Application for Devise Specific DTMs", published online at [ftp://ftp.moeller.net/DOCUMENTATION/AWB_MANUALS/h1546g.pdf], retrieved on Sep. 6, 2007.

Chinese Office Action dated Nov. 14, 2008, for Chinese Application Serial No. 200610141418, 2 pages.

International Search Report dated Nov. 13, 2009 for European Application Serial No. 06020477, 3 pages.

Schiffer. "The CIP Family of Fieldbus Protocols and its Newest Member—Ethernet/IP", Proceedings of the 2001 8th IEEE International Conference on Emerging Technologies and Factory Automation. Oct. 15-18, 2001. Piscataway, NJ. pp. 377-384.

Rockwell Automation. "Logix5000 Data Access", Mar. 2000. Published online at [http://literature.rockwellautomation.com/idc/groups/literature/documents/rm/1756-rm005_-en-e.pdf], retrieved Jun. 8, 2010, pp. 14-15.

European Search Report dated Jun. 23, 2010 for European Application Serial No. 06020477, 12 pages.

* cited by examiner

EMBEDDING CONTROLLERS AND DEVICES WITH DATA TO FACILITATE UP-TO-DATE CONTROL AND CONFIGURATION INFORMATION

TECHNICAL FIELD

The subject invention relates generally to industrial control systems and, more particularly, to communications with up-to-date configuration information in an industrial automation environment between controllers and automation devices.

BACKGROUND

A DTM (Device Type Manager) and an EDS (Electronic Data Sheet) are both machine readable representations of automation devices. They are typically used by network-centric software tools to present control information about a device to a user for purposes of assisting the user in the configuration of the device's functions.

In addition, these machine readable representations provide information about the sizes and associated structures of I/O data blocks that the device has available for real time I/O exchange with a controller. This information is then used to configure a controller's scanlist for communication with the device. The I/O data blocks typically show up in the controller data table byte or word arrays, with the specific meaning of the various elements of the data and their offset in the block having to be managed manually by the user so that the elements can be used properly with the current control program(s). Typically this mapping of the data elements to functions within the control program has to be done by the user separately for each instance of the device in the control system.

In certain controllers, the user has the option to manually create user defined structures, complete with data typing and specific labels/tags for each of the elements, which then can be applied on a per instance basis for each occurrence of the device. This comes at some expense of time and is therefore typically done only when the user expects to use many such devices in a plant. For example, a device might have, e.g., 10 bytes of input data and 10 bytes of output data as the default format from its device profile, with a function and naming convention for what each of the bits represent. However, new features could be added to the device by a vendor or manufacturer that could, for example, be useful to a customer in a particular application. In conventional systems, in the above situation, the user must add those extra elements in the data structure manually with a software programming tool because they are not in the device profile.

Moreover, even if the system has readily available control information (e.g., from an up-to-date machine readable representation such as a DTM or EDS), the device may still need to have its configuration information updated. For example, when a device gets damaged or stops functioning, maintenance personnel can often adequately perform the necessary procedures to replace the device based upon a catalog number or a part number for the device. Maintenance personnel can install a new device and reconnect it as it previously existed (e.g., mounting, electrical wiring, plumbing, air supply, pneumatic and/or hydraulic lines, etc.). However to get the device to be reconfigured to function in the same way in the system is often troublesome. Once the device is hooked up, conventional systems require a connection to the device in order to configure the device. Typically, an original configuration software tool is required as well as the current device configuration file. Often, there are difficulties in that the configuration will not be available, or will be outdated. Moreover, the maintenance personnel might actually have the proper configuration, but because there could be many instances of configuration software from many different vendors, the maintenance personnel may be unable to locate it in order to download it to the device.

These same difficulties exist not only with the configuration information, but also with the control information. For example, when it is time to configure, re-configure, troubleshoot and/or monitor the device, the DTM may not be available to the software tool. For example, the compact disc (CD) may have been lost before it was installed, or there was a firmware upgrade done to the device in the field and there is a newer version of the DTM needed, but access to the Internet is not available at that time for uploading it from the Vendor's website.

Additionally, other difficulties exist as well. For instance, a user may utilize a software programming tool to "tweak" the functionality of a device, yet these modifications do not show up in the controller and/or the controller programs, and therefore could cause undesirable consequences because the device is now functioning in a manner in which the controller is not aware. Moreover, when a Connection Originator (CO) (e.g., a controller) desires to establish a Common Industrial Protocol (CIP) I/O connection with a device, the CO issues an open connection request in accordance with the CIP Specification. Among other things, this request includes a data segment, which contains the configuration parameters for the device.

The inclusion of the device configuration data with the connection request insures that the device is setup to perform its function(s) in accordance with the needs of the CO and that the data to be exchanged will be meaningful (e.g. desired data type, properly scaled, etc.) to the CO. It also serves the added benefit of insuring that if the device is replaced, that it will be configured exactly the same as the original device. However, the data segment is limited to a theoretical max of 510 bytes. But in practice, due to limitations of network message size combined with other data in the open connection request, it is generally limited to about 450 bytes. While this was adequate for the great majority of devices in prior years, more recently devices with configuration larger than 450 bytes have become more common.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

The claimed subject matter described herein relates to embedding controllers and devices with data to facilitate up-to-data control and configuration information. An industrial automation controller, such as a programmable logic controller, can include software objects as well as data structures to store data for a variety of purposes such as for I/O communication with industrial automation devices.

In accordance with an aspect of the invention, a system and method is provided that can utilize machine readable representations to automatically create data structures in a controller and/or a Human Machine Interface (HMI). The machine readable representations can be a Device Type Manager (DTM), an Electronic Data Sheet (EDS), or any other suitable representation of the device's profile. Machine readable representations such as a DTM or an EDS contain control information about the device that a user can employ for purposes of assisting in the configuration of the device's functions and in utilizing its real-time I/O data in control programs. An updating component can read this control information and populate a data structure within the controller with information about the size, data type and position of data elements of the device that are available for real time I/O exchange with the processor. This data can be mapped to each data element of the device and given a hierarchical tag, to greatly improve the creation and maintenance of controller programs for the user.

According to another aspect of the invention, a system and method for automatic replacement of devices with large configurations is provided. The invention can utilize a Common Industrial Protocol (CIP) File Object to hold a device's configuration in the device and a copy in a Connection Originator (CO). The CO, at the time of establishing an I/O connection with the device, can determine that this connection is for a device with a large configuration. The CO can then first transmit the CIP File Object contents to the device, utilizing a fragmentation protocol. Both endpoints can negotiate a message size that is less than a threshold, and can then break up the configuration file into as many fragments as necessary to affect the transfer of the entire file within the limitations of the network and/or the device's maximum message size. Once completed, the CO then sends an open I/O connection request, except that no data segment is sent.

As a further efficiency, and in accordance with another aspect of the invention, the described aspects can be enhanced by eliminating the need to transfer the CIP File Object when the device already contains the same configuration that is held for it by the CO. A Configuration Consistency Value (CCV) attribute of the device's CIP Identity Object can be provided by the CO configuration software tool. In this case, prior to establishing an I/O connection, the CO can read the CCV from the device. If it matches, the CO can then directly open the I/O connection, thereby eliminating the time-consuming configuration file transfer process.

In accordance to yet another aspect of the invention, a vendor deployment methodology that facilitates updating a DTM in a client automation device is provided. A device manufacturer and/or vendor can determine the most up-to-date configuration and control data for a device and provide this information via the DTM. The vendor can then embed this DTM, directly into a File Object instance of the device prior to deployment. The vendor can also optionally allow future updates to the configuration and control information of the DTM. It is to be appreciated that the DTM can be embedded in firmware for the device as well.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION

Figure 1:
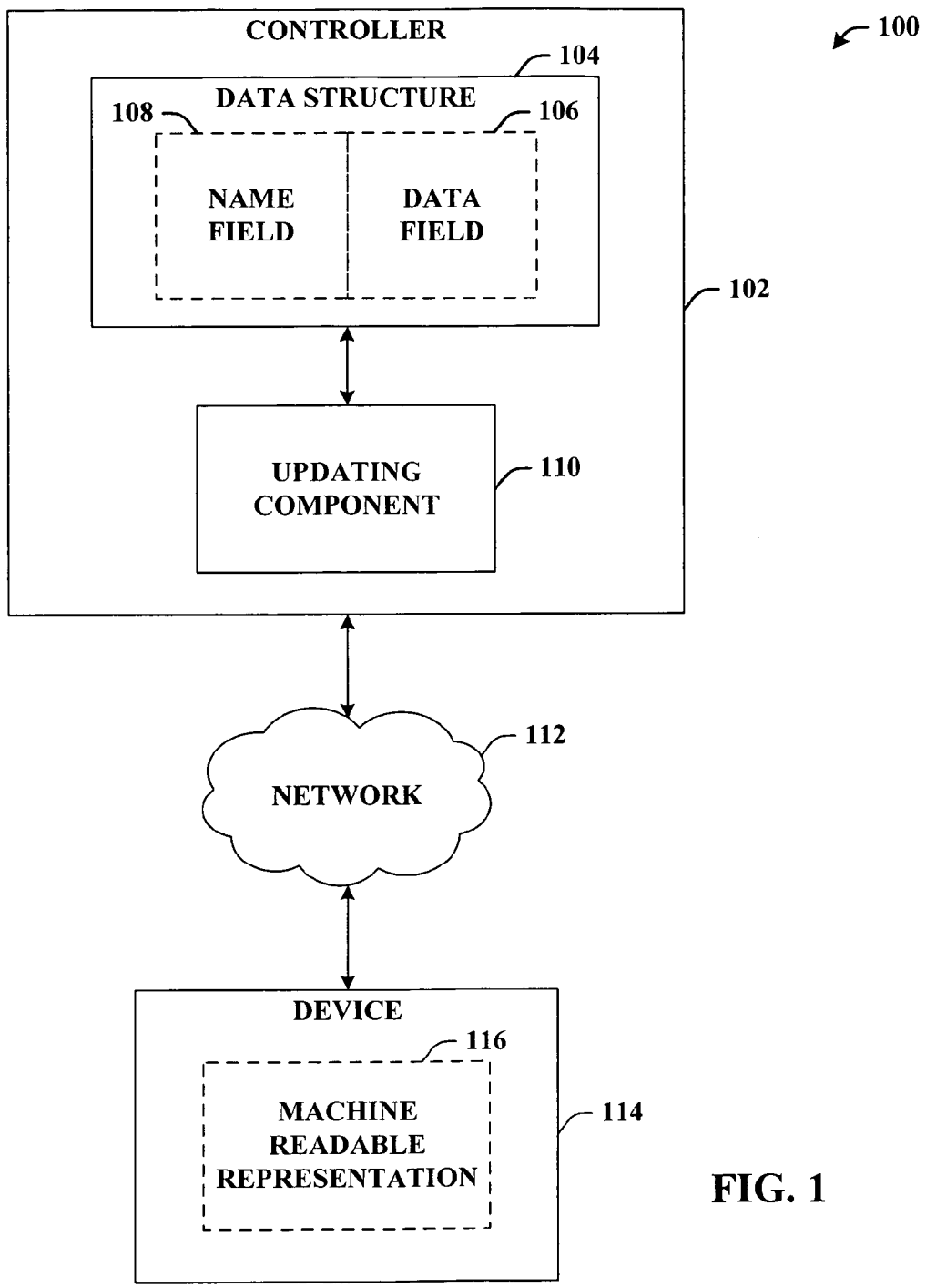
FIG. 1 illustrates a system with a controller that communicates with an automation device to facilitate up-to-date configuration information in accordance with an aspect of the invention.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer/processing device to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now referring to the drawings, FIG. 1 illustrates an industrial control system 100 with a controller 102. The controller 102 can include a data structure 104 with a data field 106 and a name field 108. The controller 102 can further include an updating component 110. The controller 102 can communicate via a network 112 with an automation device 114. Generally, a machine readable representation 116 can be stored within the device 114. The machine readable representation 116 can contain control information (not shown) about the device 114 upon which it resides. For example, the machine readable representation 116 can contain information about the sizes and associated structures of I/O data blocks (not shown) that the device 114 has available for real time I/O exchange with the controller 102. These I/O data blocks typically show up in the controller 102 data table byte or word arrays (not shown), with the specific meaning of the various fields of the data and their respective position and/or offset within the I/O data block that is used to communicate between the controller 102 and the device 114.

In particular, when communication between the controller 102 and the device 114 occurs, a default I/O data block can be transmitted. For example, the default data block may contain 10 bytes for input and 10 bytes for output and each bit and/or byte of the I/O data block can have a particular meaning based upon the configuration of the device 114. Accordingly, if the controller 102 desires to modify the behavior of the device 114, the controller 102 can adjust the data within the data block at the appropriate position in the data block. For instance if the controller 102 seeks to change the acceleration for a component of the device 114, and acceleration for that component is controlled by data in bytes 5 and 6 of the default I/O data block, then the controller 102 could modify such data at that location.

The data types, data sizes and data positions for each I/O element that can be transmitted in an I/O data block can be stored in the machine readable representation 116. Thus, in accordance with one aspect of the invention, the updating component 110 can read the machine readable representation 116 in order to discover what each bit within an I/O data exchange means. For example, the updating component 110 may discover that that acceleration of the device 116 is represented as a 16-bit word or a floating point number (float) stored in bytes 5 and 6, as well as the meanings and data types for all the other bits, bytes and/or words. The updating component 110 can also obtain the device name automatically, as detailed infra regarding FIG. 2, or based upon an input or selection by a user.

After gathering the required information, the updating component 110 can then populate the data structure 104 to dynamically create a user reference (e.g., the data structure 104). In particular, the updating component 110 stores in data field 106 information pertaining to the size, data type and position of data that can be exchanged between the device 114 and the controller 102 (e.g., bytes 5 and 6 are a single element of type float). The updating component 110 can also label the data field 106 by populating the name field 108 with a hierarchical tag that represents the device 114 itself and the data element being defined. For example, the hierarchical tag can conform to a naming convention such as <device name>.<data element>. Thus, if the device 114 is named "motor4", then the hierarchical tag can be represented, for instance, as "motor4.accel" and inserted into the name field 108. It is to be appreciated that other naming conventions are contemplated and can be used without departing from the spirit and scope of the invention. Alternatively, a profile (e.g., DTM/EDS/profile) that is embedded in the device in "machine" readable form in a File Obj can be uploaded from the device by the software tool in the personal computer (PC). The PC can then parse/decode the profile and extract the relevant information about the device's configuration options and its real time I/O data format(s).

Accordingly, in an aspect of the invention, the updating component 110 automatically creates a data structure 104 and populates the data structure 104 with data pertaining to each device 114. In accordance therewith, the invention can save time and facilitate easily understood controller programs for communicating with devices (e.g., device 114). It is to be appreciated that although only one device 114 is shown, many devices could be employed. It is to be further appreciated that the controller 102 can reside on or be a component of any suitable system or device such as a local or remote server or a Human Machine Interface (HMI). Although in this and subsequent figures the updating component 110 and/or the data structure 104 are illustrated as constituents of the controller 102, it is to be understood that such components 104, 110 need not reside within the controller 102. Rather, components 104, 110 can reside at other suitable locations, locally or remote and/or coupled with the network 112 without departing from the spirit and scope of the invention.

Figure 2:
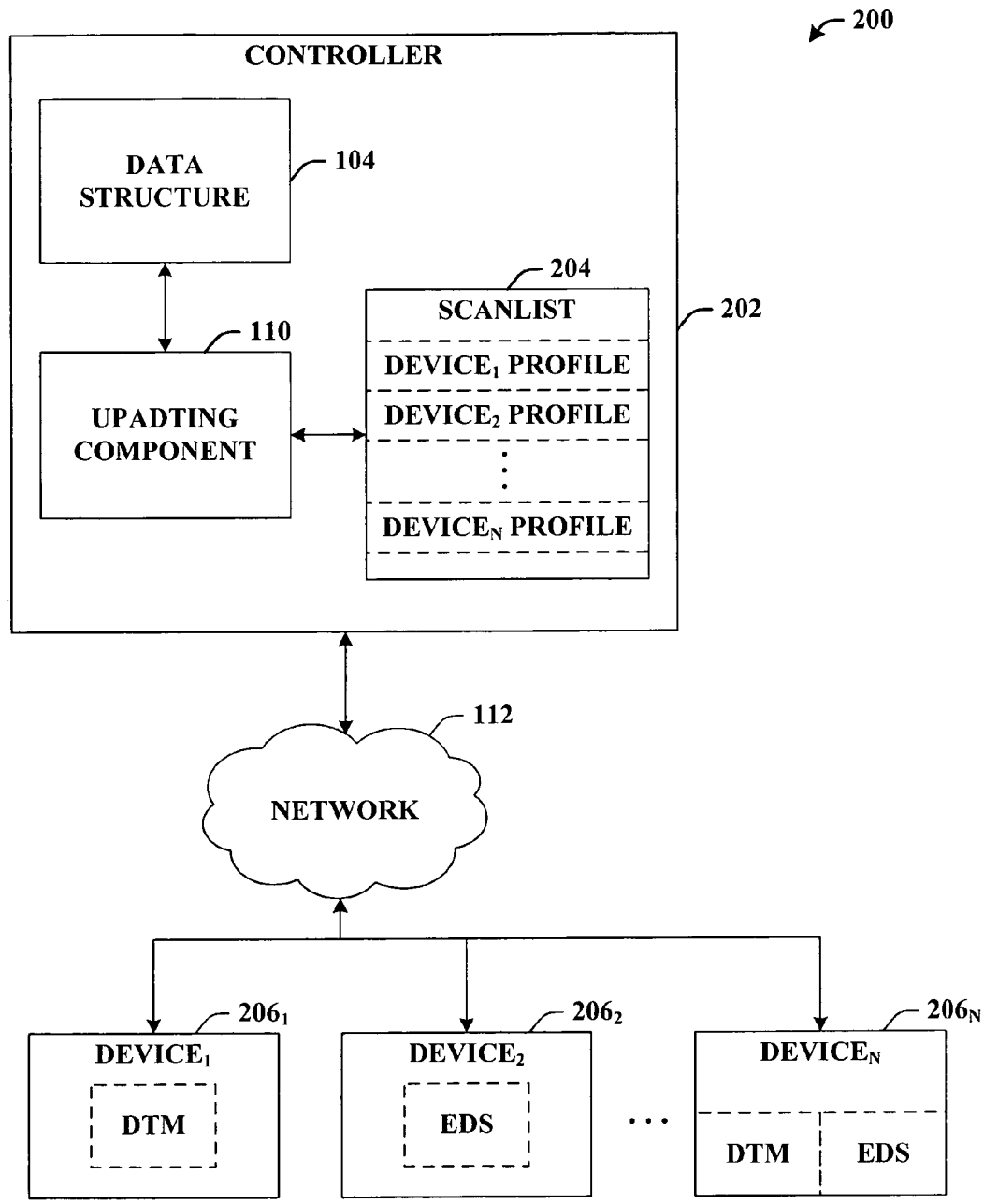
FIG. 2 illustrates a block diagram of a system with a controller that communicates with a plurality of automation devices to facilitate up-to-date configuration information in accordance with an aspect of the invention.

Turning now to FIG. 2, an industrial control system 200 is shown. Generally, the system 200 includes a controller 202 that is similar to the controller 102 (FIG. 1). In addition to the updating component 110 and the data structure 104, the controller 202 can also contain a scanlist 204 that can include device names and device profiles for all or many of the devices that exchange I/O data with the controller 202. As well, the system 200 can communicate via a network 112 with a plurality of devices $206_1$-$206_N$, referred to collectively or individually as devices 206. It is to be appreciated that although the devices 206 can be referred to collectively, hereafter respective devices 206 can have unique properties that distinguish each of the devices 206. For example, as detailed supra, the device 114 (FIG. 1) can contain a machine readable representation 116 (FIG. 1). Similarly, the devices 206 can also contain machine readable representations in the form of a Data Type Manager (DTM), an Electronic Data Sheet (EDS), or any other suitable data structure or file format.

Thus, the updating component 110 can read the DTM and/or EDS for each device 206 for which there is a device profile contained in the scanlist 204. The updating component 110 can acquire the device name for a device 206 from the scanlist 204, and can then retrieve the data element information from the devices 206 in order to populate the data structure 104. Those skilled in the art can readily appreciate that no user intervention need be required in order to generate the data structure 104. Moreover, the data structure 104 can be employed to store up-to-date control information as well as up-to-date configuration information that are hierarchically labeled for all devices, which can facilitate rapid and simple interaction by users. Additionally or alternatively, the up-to-date configuration information can be stored in a Control and Information Protocol (CIP) file object (not shown) from which the updating component 110 can obtain the configuration information.

It is to be understood that certain aspects of the invention can be utilized to automatically create the data structure 104 for all devices 206 that communicate with the controller 202, as well as for devices newly installed or replaced. In addition, the data structure 104 (and/or a CIP file object) can provide a store of information about each device's up-to-date configuration. Accordingly, the updating component 110 can be employed to update the device configuration (e.g., for a replaced device) to ensure the device will function as intended.

For example, when a device 206 gets damaged or stops functioning, maintenance personnel can often adequately perform the necessary procedures to replace the device based upon a catalog number or a part number for the device 206. Maintenance personnel can install a new device 206 and replace the wiring as it previously existed (e.g., mounting, electrical wiring, plumbing, air supply, pneumatic and/or hydraulic lines, etc.). However to get the device 206 to be reconfigured to function in the same way in system 200 is often troublesome. Typically, an original configuration software tool is required as well as the current device configuration file. However, in accordance with an aspect of the invention, the updating component 110 can retrieve the current configuration for the device 206 from the data structure 104 (and/or the CIP file object) and can subsequently transmit this information directly to the device 206.

Furthermore, if a device 206 is reconfigured or upgraded to provide for new or additional functionality, a user need not manually update the data structure with a programming tool, which is time-consuming and error-prone. Rather, the updating component 110 can read this new control information directly from the machine readable representations (e.g., a DTM and/or EDS). It is to be further appreciated that if the aforementioned updated information is not present in other identical devices 206, then the updating component 110 can mitigate this difficulty. For example, the updating component 110 can generate a message (e.g., cause an email to be created and forwarded to support staff), or update the old DTM and/or EDS directly from the data retrieved from the new DTM and/or EDS of the device 206.

Accordingly, it can be readily appreciated that control information and device configurations can be updated either within the device or the controller (e.g., the data structure 104 and/or a CIP file object). For example a device's configuration may need to be updated when a new device is installed in the system, which can be performed automatically (e.g., via the updating component 110 transmitting information from the data structure 104 to the device 206). In addition, if a device's configuration is modified directly with a programming tool, e.g., to tweak its performance, then the controller's version of the device configuration can be updated (e.g., the updating component 110 retrieves the information from the device 206 and stores it in the data structure 104). Automatic replacement of a device's 206 configuration file is discussed in more detail below in connection with FIG. 4.

Figure 3:
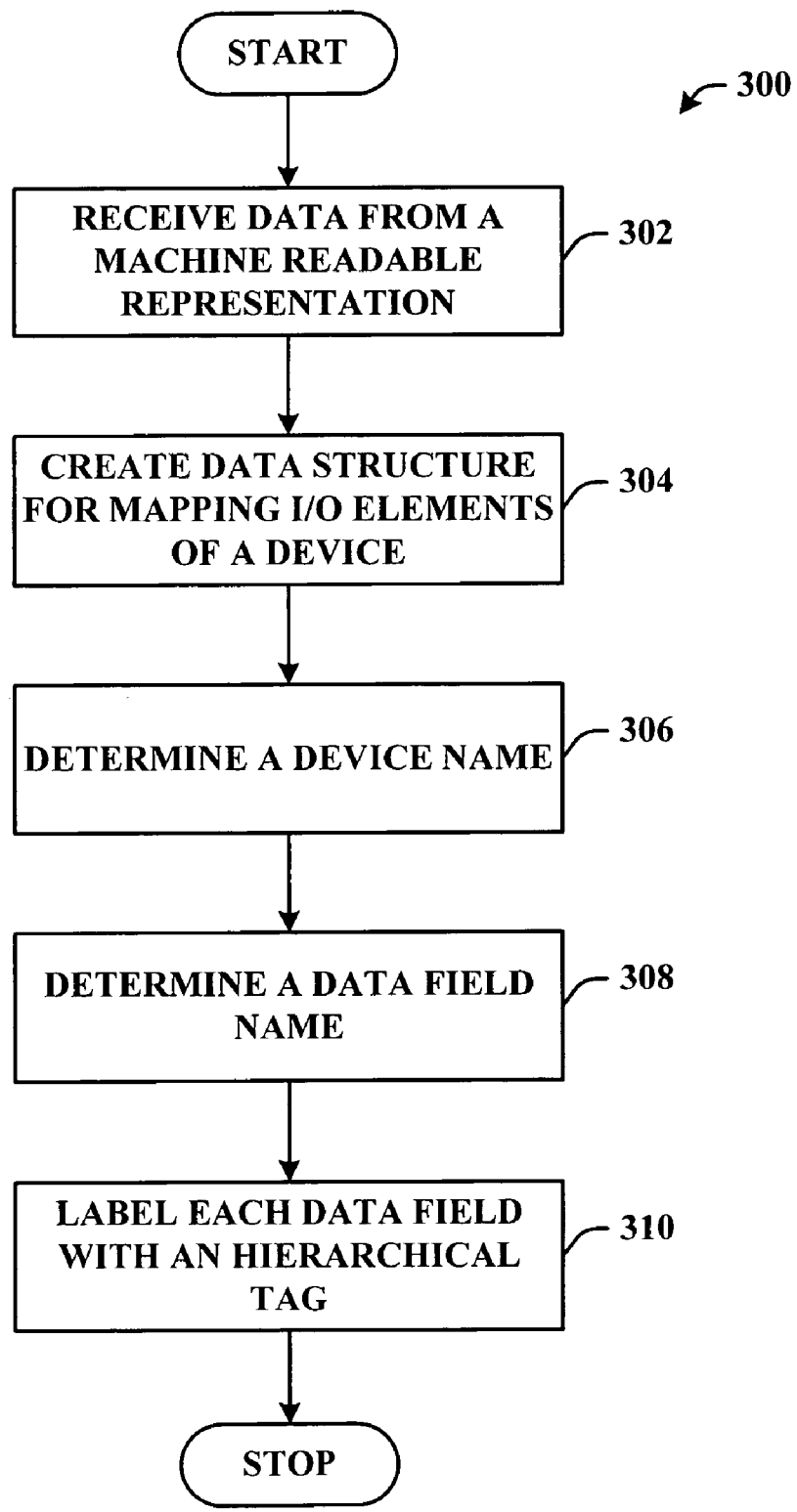
FIG. 3 illustrates an exemplary flow chart of procedures that facilitate storing data read from a machine readable representation into a data structure in accordance with an aspect of the invention.

FIG. 3 illustrates methodology 300 in accordance with the present invention. While, for purposes of simplicity of explanation, the one or more methodologies set forth herein are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning now to FIG. 3, an exemplary computer implemented methodology 300 for automatically creating data structures in a controller of an industrial control system is shown. As well, the methodology 300 can be employed via an HMI. At 302, data is received from a machine readable representation, generally by an updating component. As discussed above, the machine readable representation can be a DTM, EDS, scanlist (e.g., to retrieve the device name), and/or another suitable file format or data structure.

At 304, a data structure for mapping I/O elements of a device can be created. Typically, this data structure will have a name field and a data field for each element of I/O of a device. In general this is also accomplished by the updating component, and at this time the updating component can populate the data field with the appropriate data about a device. It is to be appreciated that a single data structure can be created for all devices or one data structure per device, as well as other implementations without departing from the scope and spirit of the invention.

At 306 the name of the device can be determined. The device name can be user inputted or selected from a list (e.g., a scanlist). In an alternative embodiment, the updating component can automatically retrieve this information from the scanlist or a device profile contained in the scanlist without any user interaction. At 308, the method 300 can determine a data field name, which is typically discovered from a machine readable representation (e.g., a DTM and/or an EDS) of a device. With both a device name and a data field name, a hierarchical name tag (e.g., <device name>.<data field name>) can be created. At 310, each data field can be labeled with the appropriate hierarchical tag.

Figure 4:
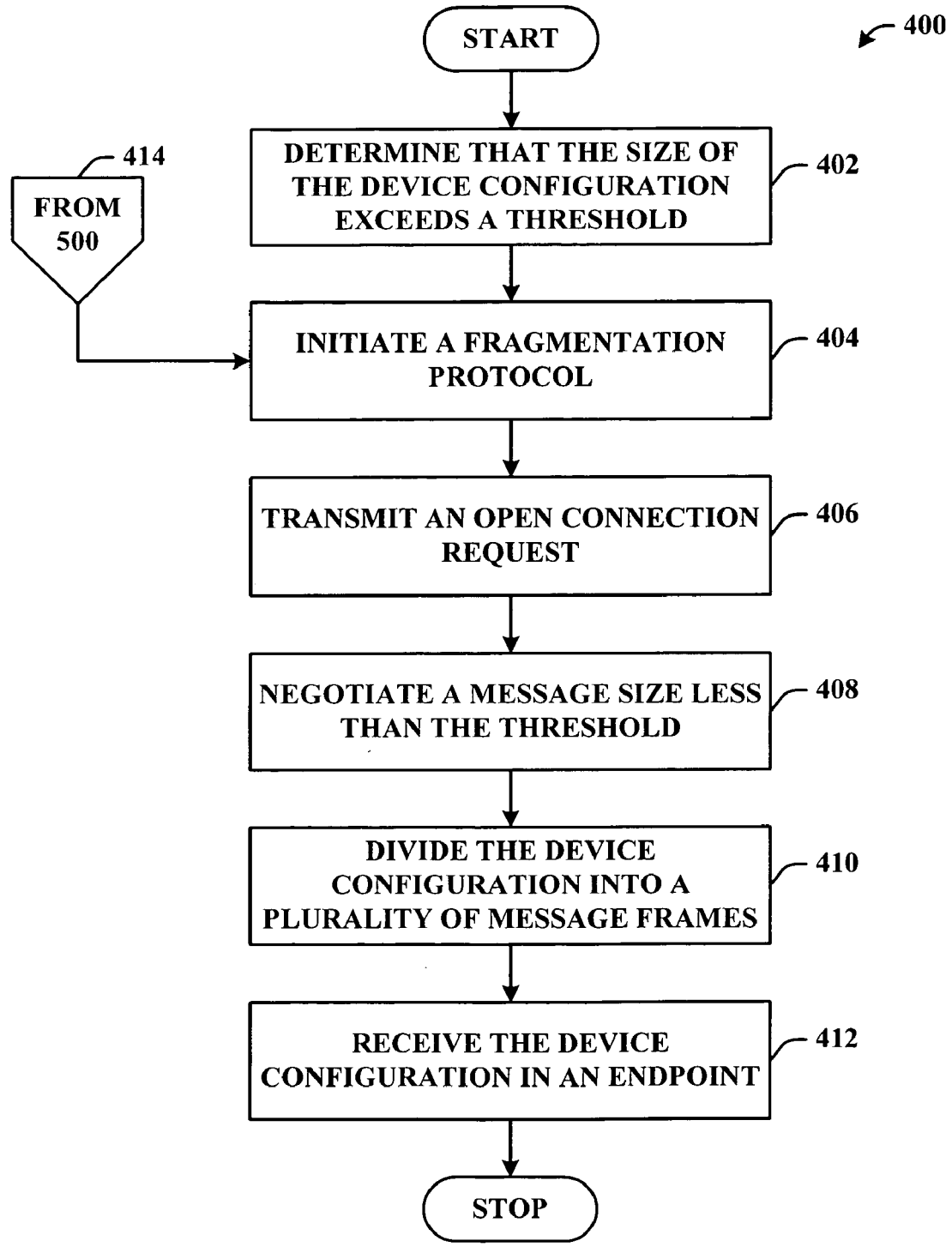
FIG. 4 illustrates an exemplary flow chart of procedures that facilitate initiating a fragmentation protocol when a size of a configuration exceeds a threshold in accordance with an aspect of the invention.

Referring now to FIG. 4, a computer implemented methodology 400 for automatic replacement of a device configuration is depicted in accordance with an aspect. For example, if a device is damaged or stops functioning, maintenance personnel can often physically replace the device, however, it must still be configured to function with the system (e.g., system 200) as the previous device functioned. As described supra, an updating component (e.g., 110 of FIG. 1) can perform this update automatically (e.g., via a CIP file object) without necessitating a manual reconfiguration. However, in some cases, a size of the configuration information may exceed a maximum limit, and, hence, cannot be transferred in the normal way due to inherent limitations of the network and/or the device's maximum message size. While the traditional size limitation was adequate for the great majority of devices in prior years, more recently, devices with larger configuration have become more common. As well, more sophisticated controllers with much larger memory have also prompted larger configuration files. The maximum size limit is further detailed infra in connection with FIG. 7.

At 402 the method 400 determines that the size of the device configuration exceeds a threshold, and at 404 a fragmentation protocol is initiated. The fragmentation protocol can determine an appropriate message size, and can then open a connection between two endpoints. It is to be understood that the fragmentation protocol can be intelligently performed as described in more detail infra in connection with FIG. 9. Subsequently, a CIP file object or other suitable object (e.g., the data structure 104) which contains the fragmentation protocol is transmitted to the second endpoint. Thereafter the protocol breaks up the configuration file in as many fragments as is necessary to affect the transfer of the entire file within the limits of the network and/or the device's maximum message size.

Accordingly, at 406, a first endpoint, typically a Connection Originator (CO), can transmit an open connection request to a second endpoint, typically a device that needs to be configured. The CO can be, for instance, a laptop connected point-to-point with the device or can address the device as a node across a network. In addition, the CO could be a remote computer or any other suitable apparatus or component. At 408, the a message size that is less than or equal to the threshold can be negotiated. At 410 the device configuration can be divided into a plurality of message frames based upon the size of the configuration file relative to the threshold. At 412, the entire configuration file can be received at the second endpoint via the plurality of message frames. Furthermore, at 414, as will be described infra, other aspects can employ the fragmentation protocol and various other acts (e.g., acts 404-412).

Figure 5:
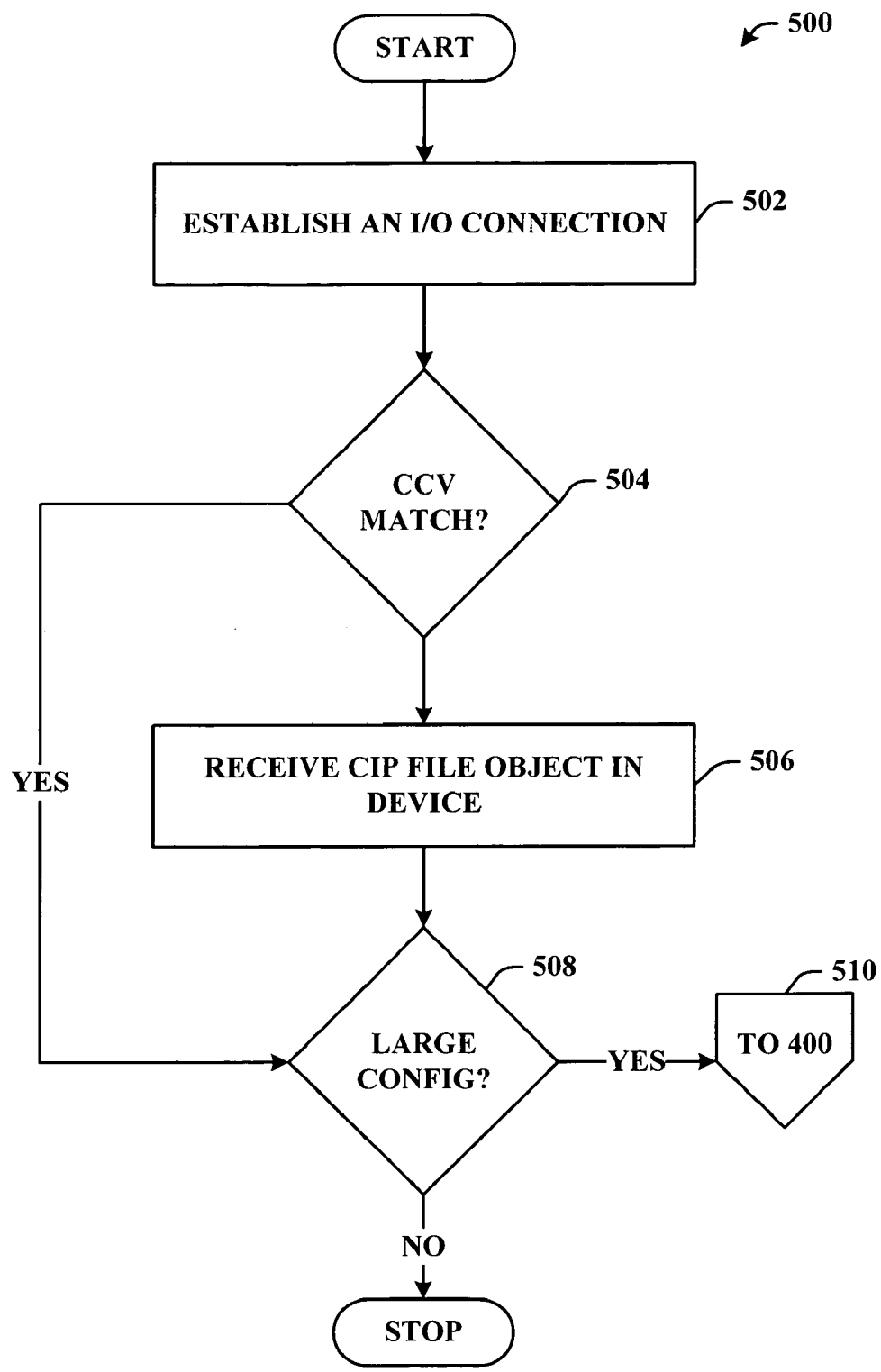
FIG. 5 illustrates an exemplary flow chart of procedures that facilitate discovering whether two Configuration Consistency Values (CCV) match in accordance with an aspect of the invention.

Turning briefly to FIG. 5, a methodology 500 for automatic replacement of a device configuration in accordance with an aspect of the invention is illustrated. The method 500 can employ some or all of certain acts illustrated in the methodology 400 (FIG. 4), as well as additional efficiencies described as acts herein. For example, the method 400 can be enhanced by eliminating the need to transfer the CIP file object (as described in connection with 402) when the device already contains the same configuration that is held for it by the CO. A Configuration Consistency Value (CCV) attribute of a device's Identity Object can be provided by the CO configuration software programming tool. In this aspect, the CO can initially establish an I/O connection that can read the CCV from the device. If the CCV values match, then CO can proceed directly to open the I/O connection, thereby eliminating the time-consuming configuration file transfer process.

In accordance therewith, at 502 an I/O connection can be established. At 504, the CCV value held in the CO is compared to the CCV value (if any) in the device. If they do not match, then at 506 the CIP file object can be uploaded from the CO to the device. If, however, at 504 the CCV values do match, then the CO can determine the device contains the same CIP file object, and thus, this object does not need to be transmitted to the device. Accordingly, act 506 can be bypassed altogether, and the method 500 can proceed to 508. At 508 a determination can be made if a size of a configuration file is larger than a threshold. If it is not, then the configuration file can be transmitted normally. However, if the size of the configuration file does exceed the threshold, thus, at 510, certain acts can be performed just as was described above regarding the methodology 400.

It is to be understood that the methods 300, 400 and 500 can employ an industrial automation protocol, and such protocol can be any suitable protocol designed for employment within an industrial setting. For example, DeviceNet, ControlNet, EtherNet/IP, Modbus, Profibus, and Foundation Fieldbus are exemplary industrial automation protocols that can be utilized in aspects of the invention. One or more of these protocols can be based at least in part upon the CIP, which can be an application layer protocol for one or more of the aforementioned industrial automation protocols. It is understood, however, that any of such protocols or combination of protocols are contemplated and intended to fall under the scope of the hereto-appended claims.

Figure 6:
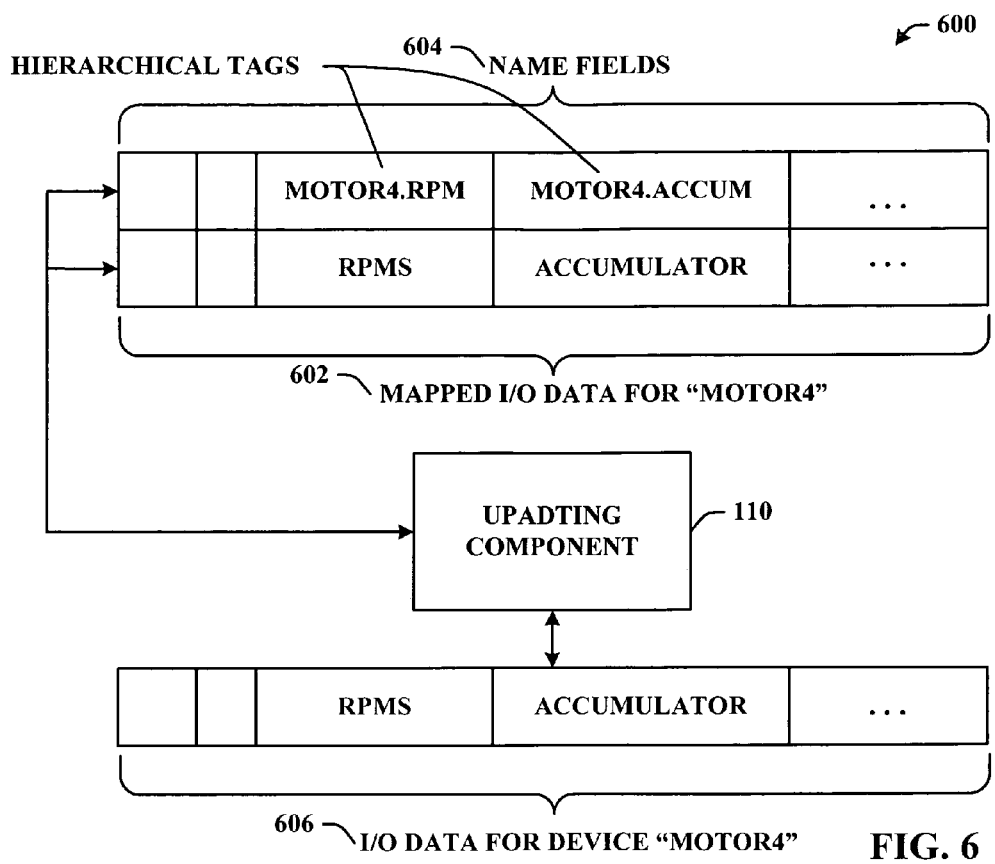
FIG. 6 illustrates exemplary data structures for a system that facilitates up-to-date configuration information in accordance with an aspect of the invention.

FIG. 6 shows more detail of the data that can be communicated between the updating component 110 (and/or a controller (not shown)) and a device (not shown). In particular, FIG. 6 illustrates in more depth the data exchanges discussed supra in connection with FIGS. 1 and 2, for example. Referring now to FIG. 6, a system 600 is depicted. The system 600 contains an exemplary data field 602 for mapped I/O data for a device, wherein the device is again named "motor4". In addition, the data field 602 can have a corresponding name field 604 for each element and/or function of the device. Similarly, a device data structure 606 is depicted. As illustrated, device data structure 606 can include various I/O data elements such as revolutions per minute (RPM) for the motor, an accumulator, and the like.

As already described with reference to FIG. 1, the updating component 110 can interact with the device data structure 606 and populate the data structures 602 and 604, respectively. In alternative embodiments, the updating component 110 can update the device data structure 606 based upon information stored in the data structures 602 and 604. It is to be appreciated that the data structures 602-606 can be any of data fields (e.g., components 106, 108 of FIG. 1), data structures (e.g., component 104 of FIG. 1), databases, files or instances of file objects (e.g., a CIP file object), data packets, data streams, message frames, data segments and/or machine readable representations (e.g., a DTM, an EDS, and a scanlist with device profiles). Accordingly, the updating component can affect automatic creation of data structures from control information provided by a machine readable representations as well as automatically replace and/or update device configurations in both a controller and a device. In addition if the device configuration is too large to be sent within a single message, a fragmentation protocol can be initialized to accomplish the updated configuration without user intervention.

Figure 7:
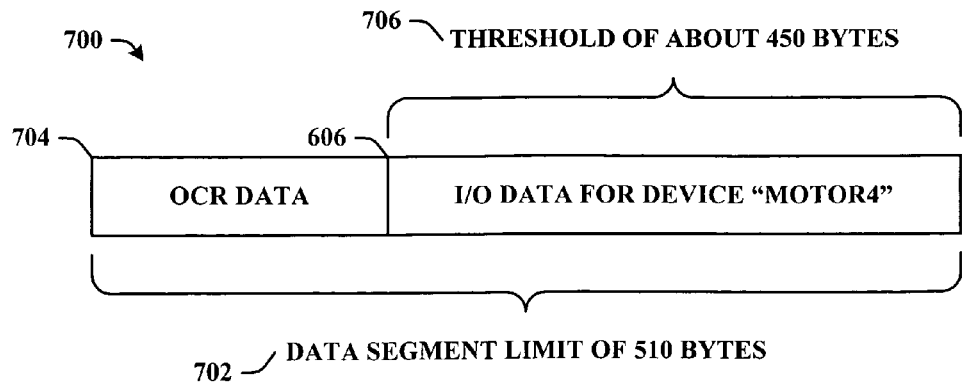
FIG. 7 illustrates an exemplary data structure for I/O exchange between a controller and an automation device in accordance with an aspect of the invention.

For instance, FIG. 7 provides more detail on when the fragmentation protocol can be employed. Turning to FIG. 7 a data structure 700 illustrates I/O data that is exchanged between a device (not shown) and a controller (not shown) and/or an HMI (not shown). The theoretical limit to a data segment 702 is 510 bytes, but in practice it is smaller than 510 bytes, due to limitations of network message size combined with other data such as an open connection request 704.

For example, the open connection request 704 can include information such as which input connection data will be used, which output connection data will be used, how often the connection will be attempted, the time out for the connection, size of the I/O data to be exchanged in both direction, etc. After the addition of this information (e.g., the data included in the open connection request 704) to the data structure 700, a threshold 706, or "true" maximum size of the data segment 702 is obtained. Generally, the data included in the open connection request 704 is about 60 bytes in length. Accordingly, the threshold 706 is about 450 bytes. Thus, data sent to or from a device such as configuration information (e.g., device data structure 606) should be less than the threshold 706. Otherwise, a fragmentation protocol such as that described supra in connection with FIG. 4 can be used to prevent the necessity of manual configuration.

Figure 8:
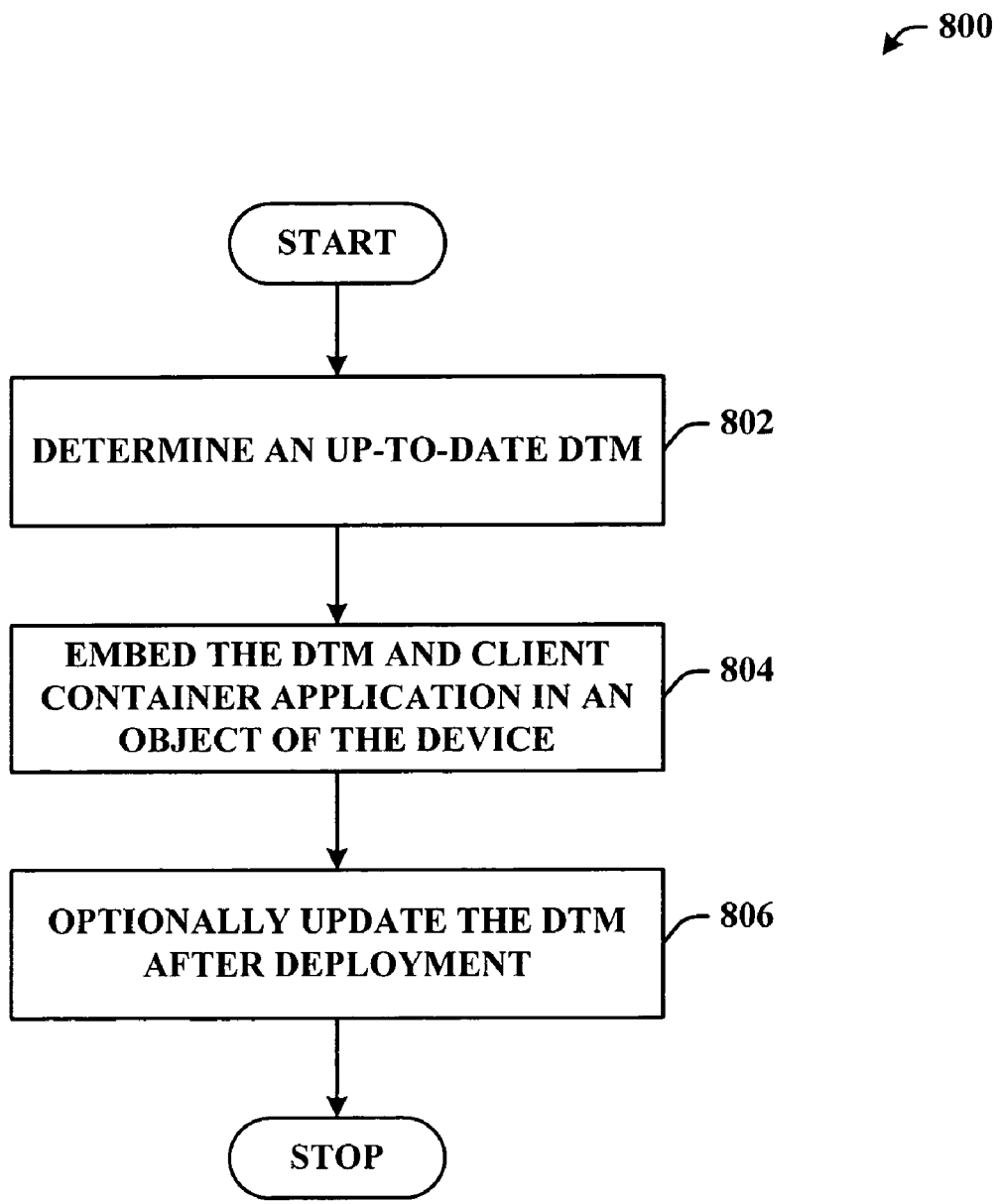
FIG. 8 illustrates an exemplary flow chart of procedures that facilitate embedding a DTM and client container application in an object of a device in accordance with an aspect of the invention.

It is readily seen that many of the aspects described herein relate to systems and methods that can ensure that control information from a machine readable representation and/or configuration information and/or files are up-to-date. Having up-to-date information affected automatically, e.g., without user interaction, can be more efficient and more reliable. In addition, having up-to-date information at all points (e.g., at both the controller and the device) can allow updating of one node by another node without requiring access to a configuration file that is not currently available, cannot be found, and/or may be incorrectly selected by a user. In accordance therewith, FIG. 8 illustrates yet another aspect of the invention that can be employed to keep control information and device configurations up-to-date, particularly in connection with a DTM. In more detail, a DTM can be a Windows-brand based software applet that conforms to an Application Program Interface (API) defined by the Field Device Tool (FDT)-DTM Joint Interest Group. The FDT can be a vendor independent client container application adhering to that same API that is used to configure various devices within a networked automation system.

The notion is that the vendor of a particular device writes a DTM compatible configuration applet, which, when installed with the FDT container, can be used to configure all occurrences of that device type within the system. This is somewhat analogous to a printer manufacturer providing a specific driver for a printer that when installed into an operating system (e.g., Microsoft Windows-brand operating system), can provide for the configuration, testing and troubleshooting help for that specific printer model. Like printer drivers, the DTM for a given device is typically made available to users by including, e.g., a compact disc (CD) with the product, downloadable from a website and/or possibly preinstalled in the FDT container applications of various configuration software suppliers.

However, when it is time to configure, re-configure, troubleshoot and/or monitor the device, the DTM may not be available to a programming software tool. For example, the CD may have been lost before it was installed, or there was a firmware upgrade done to the device in the field and there is a newer version of the DTM needed, but access to the web is not available at that time.

Turning now to FIG. 8, a vendor deployment methodology 800 that facilitates updating a DTM in a client automation device is depicted. At 802 an up-to-date DTM can be determined. As described above, configuration information and/or machine readable representations such as a DTM can be contained in a CIP file object, or other suitable data structure. As such, at 804, a vendor can embed the DTM and client container application in the CIP file object prior to deployment of the device. It is to be understood that the up-to-date DTM can be embedded in an automation device or a firmware upgrade for the device. Thus, whether it is a new device that is being shipped or a firmware upgrade for the device, an end-user is assured that the most recent DTM will be available, even without access to the original configuration information or Internet access to retrieve such from, e.g., the vendor's website.

At 806 the DTM can be optionally updated by the vendor after deployment, for instance via the Internet. More particularly, the vendor and/or device manufacturer may allow the CIP file object instance containing the DTM to be separately updated in the field. This can allow the manufacturer to make improvements to the functionality (e.g. user interface, bug fixes, etc.) of the DTM itself over time, even if the device itself has no changes in its capability. Once downloaded to the device, all subsequent accesses of the device by various maintenance or service personnel is assured of doing so with the most recent and/or proper version of the DTM. It is to be understood that such functionality can also be accomplished via a firmware update as well. It is to be further understood that a CIP file object is not mandatory. Any suitable object can be employed without departing from the scope and spirit of the invention.

Figure 9:
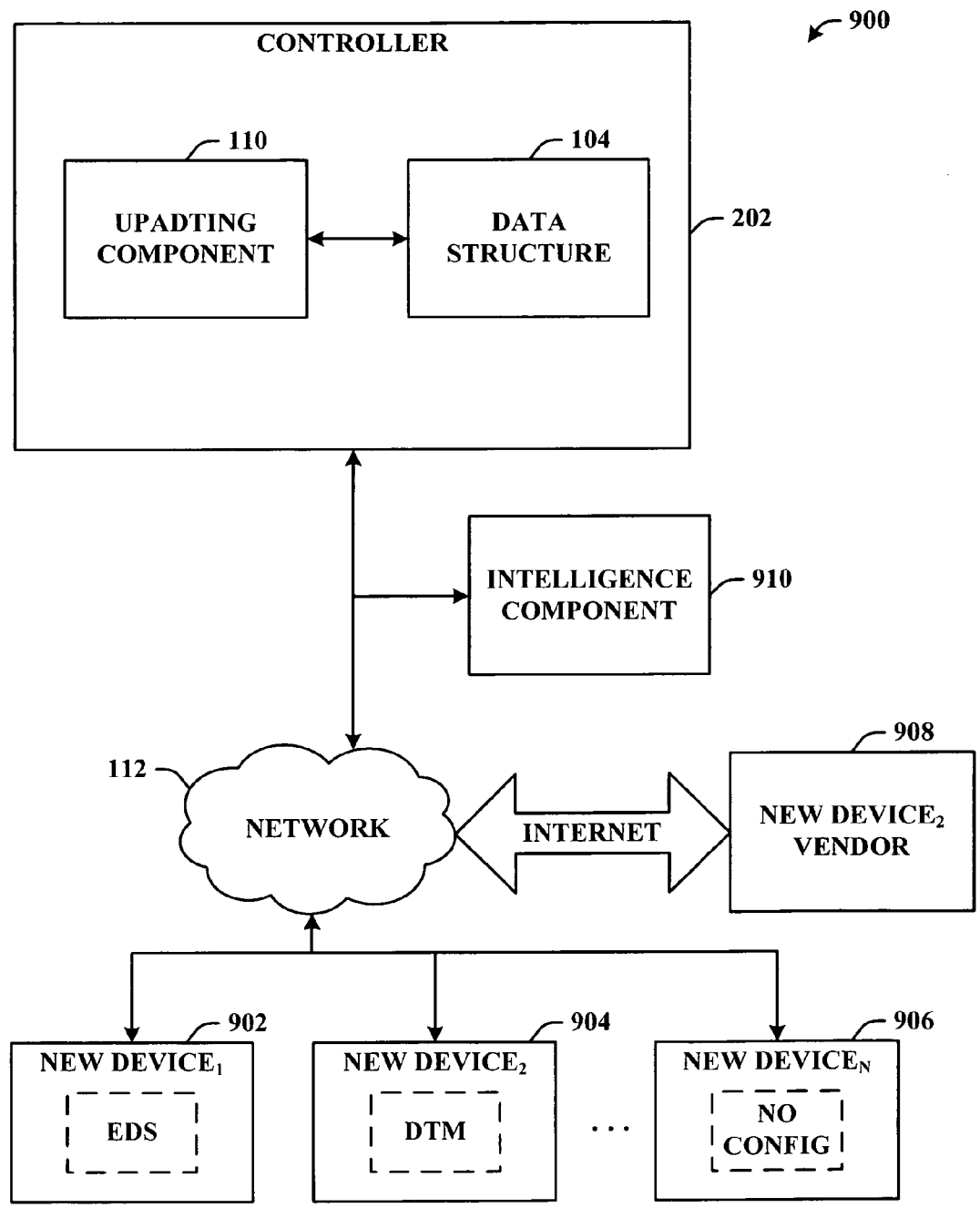
FIG. 9 illustrates a block diagram of a system with a controller that communicates with a plurality of new devices to facilitate up-to-date configuration information in accordance with an aspect of the invention.

Referring now to FIG. 9, a system 900 that facilitates up-to-date control and configuration information for devices 902-906 and a controller 202 is depicted. The system 900 can automatically create data structures in the controller 202 to facilitate proper I/O data exchange between the controller 202 and the devices 902-906, as well as easily maintained and understood controller programs. Moreover, the system 900 can provide for automatic replacement of device configurations, even when the device configuration exceeds the maximum threshold for the length of a data segment (e.g., via a fragmentation protocol). Additionally, the system 900 can facilitate embedding a DTM within a device or firmware upgrade for a device prior to deployment of the device or firmware upgrade in order to allow the most up-to-date DTM to be retrieved. Furthermore, the system 900 can provide for updatable DTMs after deployment, e.g., via the Internet or from any node on the network 112 or from a terminal connected point-to-point with the devices 902-906.

For the purpose of illustration and not limitation, devices 902-906 are devices newly installed in the system 900 e.g., to replace other devices or add functionality to the system 900. It is to be understood that the devices 902-906 need not be new, but alternatively could for any number of reasons be benefited by an automatic update to a configuration and/or machine readable representation. In one aspect of the invention, device 902 contains an EDS; however, no data exists about the device within the data structure 104 of the controller 202. As described supra the updating component 110 can read the EDS and populate the data structure 104 with control information and corresponding hierarchical tags. It is to be appreciated that the device 902 could alternatively or additionally contain a DTM or some other suitable machine readable representation that can be read from.

Device 904 can be a device newly shipped from new device vendor 908. As detailed above, the new device vendor 908 can embed the device 904 with an up-to-date DTM. Accordingly the updating component 110 can retrieve this DTM and can subsequently populate the data structure 104 with appropriate control information to allow for easy configuration of the device 904. In addition, after the new device 904 has been deployed and has been physically installed, the new device vendor 908 may allow a file object instance that contains the DTM to be updated. This could be accomplished via the network 112 that can be coupled to the Internet or another suitable manner. Alternatively, although device 904 could have been already physically installed in the system 900, a different DTM can be provided by the new device vendor 908 by way of a firmware upgrade. Subsequently, this DTM could also be updated by the new device vendor 908 in the manner described.

Device 906 can have suitable control information embedded such as a DTM or an EDS, yet it does not have an up-to-date configuration. For example, the device 906 can be newly installed to replace a broken or damaged device that was properly configured, and, hence, new device 906 needs to be updated to match the functionality of the replaced device. The updating component 110 can do this automatically based upon information stored in the data structure 104 or a CIP object file (not shown) within the controller 202. Additionally, if the configuration information that can be transmitted to the device 906 is larger than a maximum data segment size, a fragmentation protocol can be employed by the updating component 110 to affect the transfer.

According to an aspect, the system 900 can also include an intelligence component 910. Although illustrated as a separate component capable of communication via the network 112, it is to be understood that either or both of the updating component 110 and the controller 202 can include the intelligence component 910. The intelligence component 910 can, for example, be employed by the updating component 110 to determine whether control information and/or configuration information is out-of-date. It is to be appreciated that the out-of-date information can reside in either the controller 202, the devices 902-906, or other appropriate location. Moreover, the intelligence component can be used in connection with a fragmentation protocol, e.g., in order to determine a suitable message size that is less than the threshold.

The intelligence component 910 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the subject invention.

A classifier is a function that maps an input attribute vector, $x=(x1, x2, x3, x4, xn)$, to a confidence that the input belongs to a class, that is, $f(x)=\text{confidence(class)}$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, where hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 10:
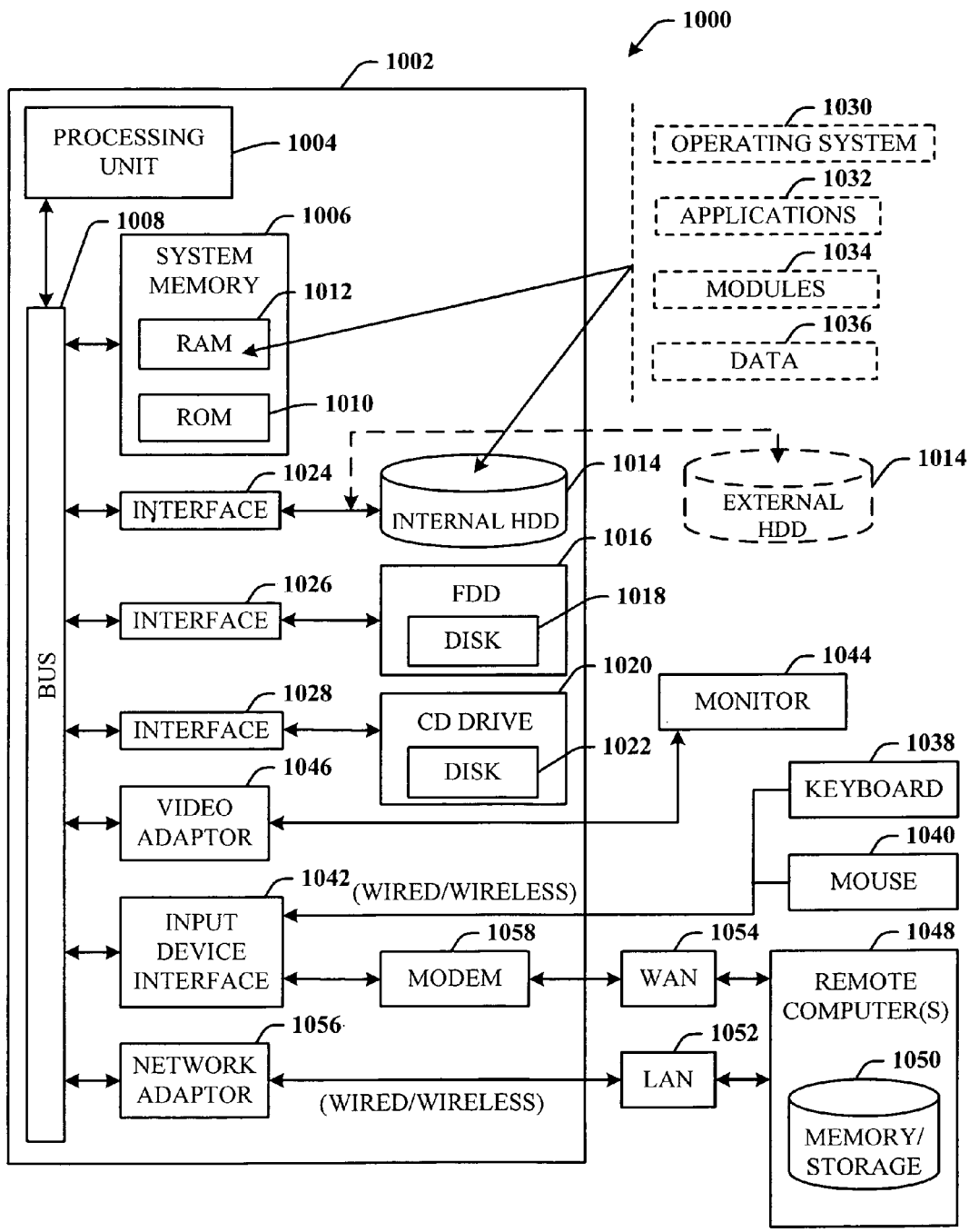
FIG. 10 illustrates a block diagram of a computer operable to execute the disclosed aspects of the invention.

Referring now to FIG. 10, there is illustrated a block diagram of an exemplary computing environment operable to execute the disclosed system and method of communicating between nodes (e.g., control systems, processors, automation devices, laptops, etc.) and updating control and configuration information. In order to provide additional context for various aspects of the subject invention, FIG. 10 and the following discussion are intended to provide a brief, general description of a suitable computing environment 1000 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the exemplary environment 1000 for implementing various aspects of the invention includes a computer 1002, the computer 1002 including a processing unit 1004, a system memory 1006 and a system bus 1008. The system bus 1008 couples to system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1094 interface technologies. Other external drive connection technologies are within contemplation of the subject invention.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the invention can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1094 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 11:
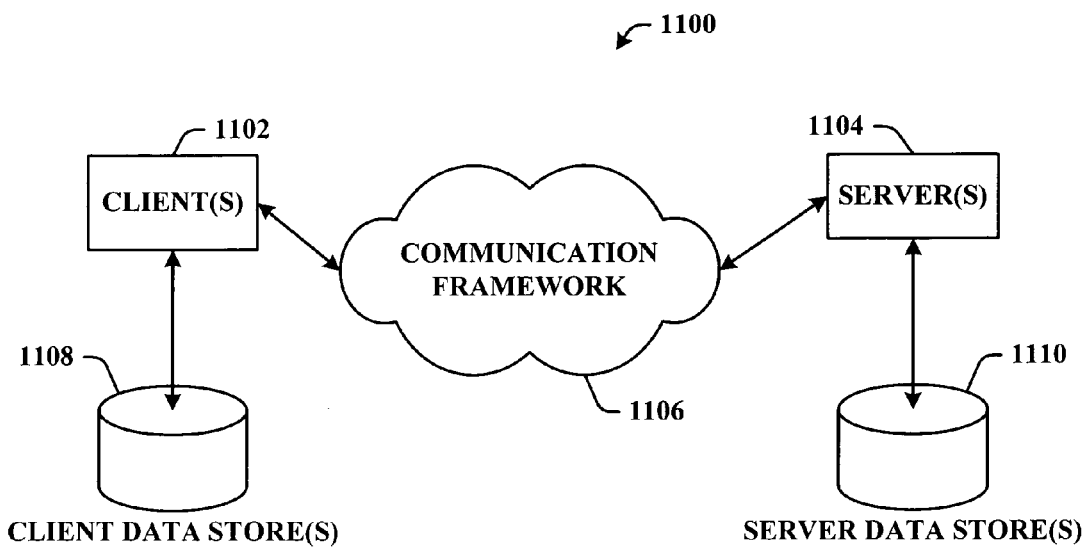
FIG. 11 illustrates a schematic block diagram of an exemplary computing environment in accordance with aspects of the subject invention.

Referring now to FIG. 11, there is illustrated a schematic block diagram of an exemplary computing environment operable to execute the disclosed system and method of communicating between nodes and updating control and configuration information. The system 1100 includes one or more client(s) 1102. The client(s) 1102 can be hardware and/or software (e.g., threads, processes, computing devices). The client(s) 1102 can house cookie(s) and/or associated contextual information by employing the invention, for example.

The system 1100 also includes one or more server(s) 1104. The server(s) 1104 can also be hardware and/or software (e.g., threads, processes, computing devices). The servers 1104 can house threads to perform transformations by employing the invention, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the terms "includes" or "contains" are used in either the detailed description or the claims, such term is intended to be inclusive in a manner similar to the term "comprising" as "comprising" is interpreted when employed as a transitional word in a claim.

What is claimed is:

1. An apparatus comprising:
    a memory;
    at least one processor, communicatively coupled to the memory, configured to facilitate execution of computer-executable components, the computer-executable components comprising:
        a data structure comprising a data field and a corresponding name field; and
        an updating component configured to read, from a machine readable representation of an automation device, information comprising an identity, a data type, and a data size of a data element that the automation device has available for exchange with a controller, to create a hierarchical tag representing the data element based on the information, to dynamically populate the name field with the hierarchical tag, and to communicatively map the data field of the controller to the data element of the automation device based on the information,
        wherein the hierarchical tag comprises a device name that represents a name of the automation device and an element name that represents the data element of the automation device.

2. The apparatus of claim 1, wherein the at least one machine-readable representation is at least one of a device type manager, an electronic data sheet, or a device profile.

3. The apparatus of claim 1, wherein the hierarchical tag is formatted as <the device name>.<the element name>.

4. The apparatus of claim 1, wherein the device name is selectable and the updating component is configured to populate the element name to correspond to the data element represented by the hierarchical tag.

5. The apparatus of claim 1, wherein the updating component is further configured to populate the device name and the element name.

6. The apparatus of claim 1, wherein the information further comprises at least one of a position of the data element within an I/O block used to exchange information between the controller and the automation device or an offset of the data element within the I/O block, and the updating component is configured to communicatively map the data field to a segment of the I/O block identified by the position or the offset.

7. The apparatus of claim 1, wherein the data structure includes a store for current configuration information of the automation device, and the updating component is further configured to retrieve the current configuration information from the data structure and send the current configuration information to the automation device.

8. The apparatus of claim 7, wherein the update component is further configured to retrieve the current configuration information from the automation device and store the current configuration information in the data structure.

9. The apparatus of claim 1, wherein the updating component is further configured to determine a maximum message size supported by the automation device, to employ a fragmentation protocol to fragment the current configuration information into messages having respective sizes less than or equal to the maximum message size, and to transmit the messages to the automation device.

10. A computer-implemented method for automatically creating a data structure in a controller of an industrial control system, the method comprising:
    receiving information from at least one machine-readable representation of an automation device, the information specifying an identity, a data type, and a data size of an input or output data element available within the automation device for exchange with the controller;
    creating, within the controller, a data structure for mapping the input or output data element of the automation device to a data field in the data structure;
    creating a hierarchical tag representing the input or output data element based on the information, the hierarchical tag including a device name representing a name of the automation device and an element name representing the input or output data element;
    labeling the data field with the hierarchical tag; and
    mapping the data field of the controller to the input or output data element of the automation device.

11. The method of claim 10, wherein the receiving the information from the at least one machine-readable representation comprises receiving the information from at least one of a device type manager, an electronic data sheet, or a device profile.

12. The method of claim 10, further comprising:
    retrieving current configuration information from the automation device; and
    storing the current configuration information in the data structure.

13. The method of claim 12, further comprising:
    retrieving the current configuration information from the data structure;
    determining a message size that does not exceed a maximum message size supported by the automation device;

fragmenting the current configuration information into a plurality of messages having respective sizes equal to or less than the message size; and sending the plurality of messages to the automation device.

14. The method of claim 10, wherein the receiving the information includes receiving information specifying at least one of a position of the data element within an I/O block used to exchange information between the controller and the automation device or an offset of the data element within the I/O block, and the mapping includes mapping the data field to a portion of the I/O block corresponding to the position or the offset.

15. A non-transitory computer-readable medium having stored thereon computer-executable instructions that, in response to execution, cause a computing device to perform operations, including:
   receiving a machine-readable representation of an automation device, the machine-readable representation comprising information defining an identity, a data type, and a data size of a data element of the automation device available for exchange with a controller;
   creating, in response to the receiving, a data structure in the controller for mapping the data element to a data field of the data structure based on the information;
   labeling the data field with a hierarchical tag comprising a device name that represents a name of the automation device and an element name that represents the data element of the automation device; and
   mapping the data field to the data element.

16. The non-transitory computer-readable medium of claim 15, wherein the receiving the machine-readable representation comprises receiving at least one of a device type manager, an electronic data sheet, or a device profile.

17. The non-transitory computer-readable medium of claim 15, the operations further including:
   retrieving a current configuration of the automation device; and
   storing the current configuration in the data structure.

18. The non-transitory computer-readable medium of claim 15, the operations further comprising:
   retrieving the current configuration from the data structure;
   determining a message size that does not exceed a maximum message size supported by the automation device;
   fragmenting the current configuration into a plurality of messages having respective sizes that are equal to or less than the message size; and
   transmitting the plurality of messages to the automation device.

19. The non-transitory computer-readable medium of claim 15, the information further defining at least one of a position of the data element within an I/O block used to communicate with the automation device or an offset of the data element within the I/O block, and the mapping includes mapping the data field to a subset of the I/O block defined by the position or the offset.

* * * * *